Nov. 19, 1935.  C. G. SUITS  2,021,752
ELECTRIC CIRCUIT RESISTANCE SENSITIVE APPARATUS
Filed May 26, 1932
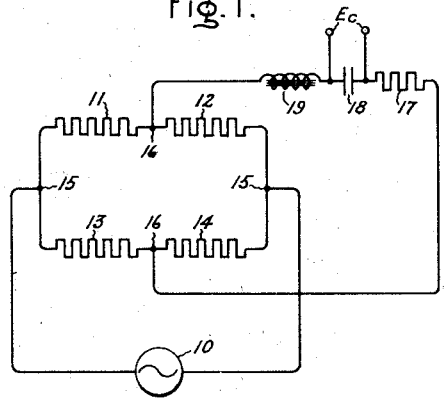
Fig. 1.
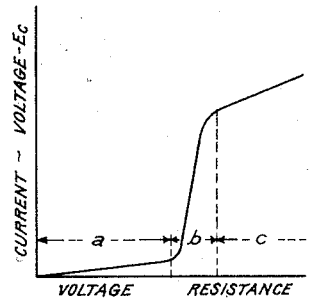
Fig. 2.
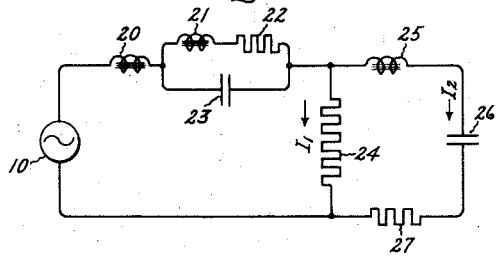
Fig. 3.
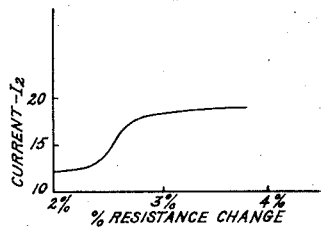
Fig. 4.
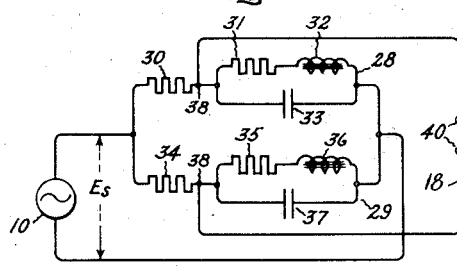
Fig. 5.
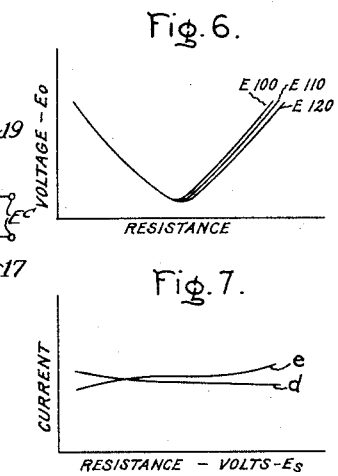
Fig. 6.
Fig. 7.
Inventor:
Chauncey G. Suits,
by  *Charles E. Tullar*
His Attorney.

Patented Nov. 19, 1935

2,021,752

UNITED STATES PATENT OFFICE 2,021,752

ELECTRIC-CIRCUIT RESISTANCE-SENSITIVE APPARATUS

Chauncey G. Suits, Schenectady, N. Y., assignor to General Electric Company, a corporation of New York Application May 26, 1932, Serial No. 613,693

15 Claims. (Cl. 171—119)

My invention relates to electric circuit resistance-sensitive apparatus and more particularly to electric circuit resistance-sensitive apparatus adapted for temperature measurement, indication, control or regulation.

There are certain applications in the measurement and control of variable quantities which require an electric circuit arrangement of extreme sensitivity to small changes in resistance but independent or relatively insensitive to variations in the voltage of the source from which the circuit is energized. Electric circuit arrangements including resistance variant elements in bridge arrangements and other circuit relations have been suggested or used in the past for measuring, indicating, regulating or controlling temperature or other variable quantities in accordance with changes in a given resistance element. However, the known arrangements are subject to errors due to variations in the voltage or current of the source of energization for the circuit including the resistance variant element, and do not possess the required degree of simplicity and economy required in many commercial applications.

It is an object of my invention to provide an improved electric circuit arrangement which shall be relatively highly sensitive to changes in resistance and relatively insensitive to variations in the voltage or current of the source of energization for the circuit.

It is another object of my invention to provide an improved electric circuit arrangement including circuit elements having a non-linear volt-ampere characteristic which shall provide a resistance-sensitive, voltage-independent, temperature-responsive device.

It is a further object of my invention to provide an improved alternating current electric circuit arrangement having an output voltage which varies rapidly with changes in resistance and is substantially independent of variations in the voltage of the source of energization for the circuit arrangement.

My invention will be better understood from the following description taken in connection with the accompanying drawing and its scope will be pointed out in the appended claims.

In the drawing Fig. 1 is a diagrammatic illustration showing schematically a general circuit arrangement of one embodiment of my invention suitable for relay operation; Fig. 2 is an illustrative curve for explaining the operation of different embodiments of my invention; Fig. 3 is another embodiment of my invention comprising two circuits, each of which includes circuit elements having non-linear volt-ampere characteristics; Fig. 4 is a diagram for explaining an operating characteristic of the arrangement shown in Fig. 3; Fig. 5 is still another embodiment of my invention utilizing non-linear circuit elements in the form of an electrical bridge, and Figs. 6 and 7 are diagrams for explaining operating characteristics of the arrangement shown in Fig. 5.

In accordance with my invention I employ circuit elements having a non-linear volt-ampere characteristic in various combinations with capacitance and resistance elements and arranged in an electric network energized from an alternating current source in such a manner that an output voltage is obtained which varies in accordance with variations in the resistance of a resistance element of said network and is substantially independent of variations in electrical conditions of the source of energization for the network.

Electric circuits comprising circuit elements of inductance, capacitance and resistance which depend upon current are with few exceptions distinguished by non-linear volt-ampere characteristics. Throughout the specification and claims "non-linear" element or circuit will be used to indicate an element or circuit having a non-linear volt-ampere characteristic.

Referring to Figs. 1 and 2, and for the present to Fig. 1, 10 indicates a source of alternating current which is connected to energize an electric bridge circuit comprising impedances 11, 12, 13, and 14 diagrammatically illustrated as resistances for showing schematically any general impedance bridge circuit having an output voltage differing from zero and being substantially independent of variations in the voltage of the source. The bridge circuit is provided with input terminals 15 and output terminals 16. In a bridge circuit of this type the output voltage across the terminals 16 may be made to vary in response to a change of resistance in arm 11, for example. This variation in voltage is independent of the energizing voltage across the input terminals 15 for proper choice of the impedances 12, 13, and 14. One such proper choice is the selection of an impedance in each parallel branch of the network of the type illustrated in Fig. 5. Since the change in output voltage is continuous with a change in resistance 11, for example, it is not very suitable for producing an "on-off" characteristic for operating relays.

In accordance with my invention I connect a non-linear circuit across the output terminals 16 of the impedance bridge and utilize the non-linear circuit to produce a current or voltage which may be used to energize auxiliary indicating, control or regulating apparatus. As illustrated, the non-linear circuit comprises a simple series circuit consisting of a linear resistance 17, a linear capacitance 18, and an iron core inductance 19. The particular circuit illustrated may exhibit the volt-ampere relation graphically shown in Fig. 2. The linear region $a$ of small current is associated with the unsaturated condition of the iron while the linear region $c$ is had for saturation values of the core material. In the region $b$ the current rises to such maximum values that instantaneously the capacitance and inductance voltages become equal and opposite, resulting in a quasi-resonance state which I have designated as non-linear resonance. Thus in the arrangement illustrated in Fig. 1, the resistance 11 may be caused to vary in response to a changing temperature. The output voltage from the terminals 16 energizes the non-linear circuit 17—18—19 to produce a voltage Ec across the capacitance 18 which varies with a change in the resistance 11 in a manner similar to the volt-ampere characteristic of the non-linear circuit shown in Fig. 2. This figure is also used to show graphically the variation of the voltage Ec with the change in the variable resistance 11. The voltage Ec may be used to produce an "on-off" characteristic to energize auxiliary apparatus or relays.

In Fig. 3 I have shown another embodiment of my invention which employs a plurality of non-linear circuits in an electrical network to obtain a resistance sensitive device which provides an output voltage or current independent of variations in a voltage of the source of energization of the network. The arrangement as illustrated comprises a source of alternating current 10 connected to energize a series-parallel combination of resistance, capacitance and saturable inductances consisting of a saturable inductance 20 connected in series relation with a parallel branch consisting of a saturable inductance 21 resistance 22, and capacitance 23. This series-parallel combination with properly chosen values of circuit constants has the unique property of providing a constant wave form of series current $I_1$ for substantial variations of supply voltage. A resistance 24 is connected in series relation with the series-parallel combination to obtain a voltage which is proportional to the current $I_1$ traversing the circuit. Thus for a constant wave form of the current $I_1$ in the circuit, the voltage drop across the resistor 24 is a function of the magnitude of the resistance through substantial variations in the voltage of the source 10. By providing a circuit which is critical in voltage, small variations in value of the resistance 24 may be detected. The simple series circuit described in connection with the arrangement illustrated in Fig. 1 and having the volt-ampere characteristic as illustrated in Fig. 2 has precisely this critical dependence upon voltage. Hence, as illustrated, a series non-linear circuit consisting of a saturable reactor 25, a capacitance 26 and a resistance 27 are connected to be responsive to the voltage drop across resistance 24. At a certain value of voltage impressed upon the series circuit comprising the elements 25, 26, and 27, the current $I_2$ through this circuit rises many fold in response to voltage increments across resistance 24 of a fractional per cent in magnitude as shown in Fig. 2. Thus in the arrangement illustrated, the current $I_2$ responds to variations in resistance of 24 in a very critical manner.

In Fig. 4 is shown an illustrative current-resistance characteristic of a network having impedance values chosen for illustrative purposes and assembled as shown in Fig. 3. With the particular constants chosen the current $I_2$ varies as a function of the resistance of the element 24, such that changes in the value of the resistance 24 of a fractional percentage results in a change in the current $I_2$ of the order of 30 per cent.

The resistance element 24 may be subjected to the air of a room, the material in a furnace, or any fluid, liquid, gas or substance, the temperatures of which it is desired to indicate, measure, control or regulate. The resistance element 24 may also be immersed in a constant flow of gas and the detection of the composition of the gas may be accomplished by observing the current $I_2$ which will vary in accordance with the conductivity of the gas, which in turn depends upon the composition.

Fig. 5 shows another embodiment of my invention which takes the form of a bridge circuit. In the measurement of temperature, where a constant direct current voltage is available, it is customary to employ a Wheatstone bridge circuit in which one of the four resistance arms is the temperature sensitive element. If a simple bridge circuit of linear impedances is used on an alternating current supply, and if suitable means of detecting the output current are provided, it is found that two practical difficulties occur. First, the deflection of the output or detecting device is independent of line voltage fluctuations only at the exact balance point of the bridge, but at the balance point the condition for zero power output also obtains, so in practical cases it is necessary to operate such bridges off balance, where as noted, the deflection is subject to supply voltage fluctuations. The second difficulty arises from the fact that with fluctuations in supply voltage, the current in the temperature sensitive element also varies. When this occurs, the temperature of this element depends upon supply voltage, which is undesirable from the point of accuracy.

In accordance with my invention as illustrated in Fig. 5 I provide an alternating current bridge circuit which may be used with a varying supply voltage without encountering the difficulties recited in connection with the usual alternating current bridge circuit. The bridge circuit comprises the arms 28 and 29 connected to be energized in parallel from the alternating voltage source 10. The arm 28 consists of a resistance 30 connected in series with a parallel branch comprising a resistance 31 and an inductance 32 in series relation and connected in parallel with a capacitance 33. Similarly, the arm 29 consists of a resistance 34 connected in series with a parallel branch comprising a resistance 35 and an inductance 36 in series relation and connected in parallel with a capacitance 37. The resistance 34 may be selected as the resistance variant element of the bridge which is subjected to the variable condition, such as temperature, which is to be indicated, controlled or regulated. At the junction points 38 of the bridge an output circuit is provided for supplying an output voltage $E_o$ across the terminals 40 which varies in accordance with a change in the series resistance 34. If a voltage is desired for producing an "on-off" characteristic to energize auxiliary apparatus or relays, a non-linear circuit as shown in Fig. 1, comprising a linear resistance 17, a linear capacitance 18, and an iron core inductance 19, may be connected across the terminals 40. The voltage $E_c$ across the capacitance 18 may be used to energize auxiliary apparatus or relays. When the inductances 32 and 36 exhibit saturation characteristics a series-parallel circuit of this type has constant current properties; that is, the current through the series resistances 30 and 34 is independent of substantial changes in the applied voltage. It is also true that for this constant voltage supply the series resistances 30 and 34 may be varied without materially changing the series current. From the foregoing discussion it will be observed that one of the objections to the usual bridge arrangement is removed, for with constant current in the series resistance 30 or 34, either of which may be made the temperature sensitive element, the dependence of temperature upon supply voltage variations is removed.

In Fig. 6 is shown illustrative curves of a bridge of the type illustrated in Fig. 5 in which the output voltage $E_o$ is plotted as a function of the resistance in one arm of the bridge for different value of supply voltage indicated at E100, E110 and E120. It may be seen that for changing values of the resistance 34, for example, between given limits, the output voltage is independent of the supply voltage variations to a very substantial degree. For the particular arrangement for which the readings were taken the curves for the three different voltages chosen coincide between values of resistance 34 between 150 and 180 ohms.

It remains to be shown that the constant current property is had for the same values of series resistance for which independence of the supply voltage is available. The illustrative curves $d$ and $e$ shown in Fig. 7 show these features. Thus, in curve $d$ of Fig. 7, the current in the resistance 34 is shown as a function of the resistance. Substantial variations in resistance 34 thus produce negligible changes in current through the resistance. In curve $e$ the current in resistance 34 is shown as a function of the supply voltage, and it is to be observed for this case that the current in the resistance sensitive element is similarly insensitive to variations in the supply voltage.

Similarly to the previously described arrangement, the series resistance 30 or 34 of the bridge circuit of Fig. 5 may be subjected to any fluid, liquid, gas or substance, the temperature of which it is desired to indicate, measure, control or regulate. Various other applications in which variations in a resistance is utilized to indicate, measure, control or regulate a variable quantity will occur to those skilled in the art, and a temperature sensitive element is merely referred to by way of example.

While I have shown and described particular embodiments of my invention, it will occur to those skilled in the art that various changes and modifications may be made without departing from my invention and I, therefore, aim in the appended claims to cover all such changes and modifications as fall within the true spirit and scope of my invention.

What I claim as new and desire to secure by Letters Patent of the United States, is,—

1. An electric network comprising a branch circuit including a variable impedance element and means for maintaining constant current in said branch circuit for producing a voltage across said impedance element which varies substantially solely in accordance with variations in an electric property of said impedance element, and an electric circuit having a non-linear volt-ampere characteristic solely dependent upon the electric properties of said electric circuit and connected to be energized in accordance with said voltage.

2. An electric network including a variable resistance element and means for producing an output voltage across said resistance element which varies substantially solely in accordance with variations in said resistance element, and a circuit including a non-linear inductance and a capacitance connected to be energized in accordance with said output voltage.

3. In combination, a source of current subject to variations in voltage, an electric network connected to be energized from said source and comprising a plurality of impedance elements for producing a constant current from said source, a variable impedance element connected in series relation with said network, and an electric circuit having a non-linear volt-ampere characteristic solely dependent on the electric properties of said circuit and connected to be energized in accordance with the voltage across said variable impedance element.

4. In combination a source of current subject to variations in voltage, an electric network connected to be energized from said source and comprising a plurality of impedance elements arranged in the form of an electric bridge having input and output terminals, the volt-ampere characteristics of the respective impedance elements between input terminals being selected for producing a continuous linear change in voltage across the output terminals of said bridge with a continuous variation in one of said impedance elements independent of variations in the voltage of said source, and a circuit having a non-linear volt-ampere characteristic connected to the output terminals of said bridge for producing a voltage changing non-linearly with changes in said one of said impedance elements.

5. In combination, a source of current subject to variations in voltage, an electric network connected to be energized from said source and comprising a plurality of impedance elements arranged in the form of an electric bridge having input and output terminals, each branch circuit of said bridge between input terminals including a resistance element and linear and non-linear reactive impedance elements, the volt-ampere characteristics of said impedance elements of each branch circuit being selected for producing a continuous linear change in voltage across the output terminals of said bridge with continuous variations in one of said resistance elements independent of variations in the voltage of said source, and a circuit including a saturable reactor and capacitance connected in series relation across the output terminals of said bridge for producing a voltage changing non-linearly with changes in said one resistance element.

6. An electric network having input and output terminals and comprising a plurality of impedance elements arranged in the form of an electric bridge, the respective impedance elements of each branch circuit between said input terminals having volt-ampere characteristics such that for a variation in voltage applied across said input terminals a predetermined current relation is maintained in each branch circuit of said bridge for producing a constant voltage across said output terminals, and a circuit having a non-linear volt-ampere characteristic connected to be energized from the output terminals of said bridge.

7. An electric network having input and output terminals and comprising a plurality of impedance elements arranged in the form of an electric bridge, the impedance elements in each branch circuit between input terminals including a resistance element and reactive impedance elements, the respective reactive impedance elements having volt-ampere characteristics such that for a variation in voltage applied across said input terminals a constant current is maintained in the resistance element of each branch and a circuit including a saturable reactor and a capacitance connected to be energized from the output terminals of said bridge.

8. An electric network comprising a plurality of impedance elements for producing a constant wave form of current from a variable voltage source, a temperature variant impedance connected in series relation with said plurality of impedances, and a circuit having a non-linear volt-ampere characteristic connected to be energized from said temperature variant impedance.

9. An electric network comprising a non-linear inductive impedance connected in series relation with a parallel branch including a series connected resistance and non-linear inductive impedance connected in parallel relation with a capacitive impedance, a temperature variant impedance connected in series relation with said plurality of series-parallel connected impedance elements, and a circuit having a non-linear volt-ampere characteristic connected in parallel relation with said temperature variant impedance.

10. An electric network comprising a branch circuit including a saturable inductance connected in series relation with a series connected resistance and saturable inductance connected in parallel relation with a capacitance, a temperature variant resistance connected in series relation with said series-parallel connected branch circuit, and a circuit including a series connected resistance, capacitance and a saturable inductance connected in parallel relation with said temperature variant resistance.

11. An alternating current electric network comprising two branch circuits connected in parallel relation between input terminals and having impedance elements in each branch circuit with the volt-ampere characteristics of the respective elements correlated for producing constant current in each branch circuit with a variable voltage applied to said input terminals, and an impedance variable independently of an electric quantity of said network connected in circuit with one of said branch circuits for producing a branch voltage between points intermediate said input terminals substantially solely dependent upon variations in the independently variable impedance.

12. An electric network comprising four impedance arms arranged in the form of an electric bridge, two of said arms comprising resistance units, each of the remaining arms comprising a parallel branch circuit including a series connected resistance and non-linear impedance connected in parallel relation with a capacitive impedance, and input and output circuits connected to the alternate junction points of said bridge.

13. An electric network comprising four impedance arms arranged in the form of an electric bridge, a source of current connected to alternate junction points in said bridge, two of said arms comprising resistance units, each of the remaining arms comprising a parallel branch circuit including a series connected resistance and a saturable inductance connected in parallel relation with a capacitance, and an output circuit connected to the remaining alternate junction points of said bridge.

14. In combination, a source of current subject to variations in voltage, an impedance network connected to be energized from said source and including a circuit element having an electric property variable independently of an electric quantity of said network, and means for producing in said network a branch voltage differing from zero and being variable in accordance with variations in said electric property of said circuit element and substantially independent of variations in the voltage of said source, and a non-linear circuit connected to said network for energization in accordance with said branch voltage.

15. In combination, an electric network including a circuit element having an electric property variable independently of an electric quantity of said network and means for producing in said network a branch voltage having a continuous variation substantially solely dependent upon variations in an electrical property of said circuit element, and a non-linear circuit connected to be energized in accordance with said branch voltage for producing a discontinuous variation in a branch voltage of said non-linear circuit.

CHAUNCEY G. SUITS.